United States Patent [19]

Theurer et al.

[11] Patent Number: 5,161,312
[45] Date of Patent: Nov. 10, 1992

[54] MACHINE FOR MONITORING THE VERTICAL POSITION OF A CONTACT WIRE OF AN OVERHEAD LINE

[75] Inventors: Josef Theurer, Vienna; Leopold R. Gruber, Scheibbs, both of Austria

[73] Assignee: Franz Plasser Bahnbaumaschinen-Industriegesellschaft m.b.H., Vienna, Austria

[21] Appl. No.: 764,160

[22] Filed: Sep. 23, 1991

[30] Foreign Application Priority Data

Oct. 3, 1990 [AT] Austria .................................. 1996/90
Mar. 1, 1991 [AT] Austria .................................... 435/91

[51] Int. Cl.⁵ ............................................... G01B 5/00
[52] U.S. Cl. ........................... 33/501.02; 33/501.03; 33/501.04; 33/523.1; 33/1 Q; 33/832; 33/833; 33/837
[58] Field of Search ............ 33/832, 833, 837, 501.02, 33/501.03, 501.04, 523.1, 523.2, 1 Q, DIG. 13, 287; 191/65, 67, 68

[56] References Cited

FOREIGN PATENT DOCUMENTS

| 226769 | 4/1963 | Austria .................................. 191/66 |
| 0047819 | 3/1982 | European Pat. Off. .............. 191/67 |
| 2552244 | 3/1985 | France .................................. 191/65 |

Primary Examiner—William A. Cuchlinski, Jr.
Assistant Examiner—Alvin Wirthlin
Attorney, Agent, or Firm—Kurt Kelman

[57] ABSTRACT

In a machine for monitoring the vertical position of a contact wire of an overhead line extending above a track, which comprises a self-propelled machine frame including a superstructure, an undercarriage supporting the machine frame on the track and having wheels journaled on a wheel axle and engaging the running faces of the track rails, and a vertically adjustable measuring yoke mounted on the machine frame, a frame is vertically adjustably mounted on the machine frame for monitoring the vertical position of the contact wire, the monitoring frame having an upper end and a device connected to the upper monitoring frame end for measuring the vertical position of the contact wire, and a lower end at a fixed distance from the plane.

20 Claims, 3 Drawing Sheets

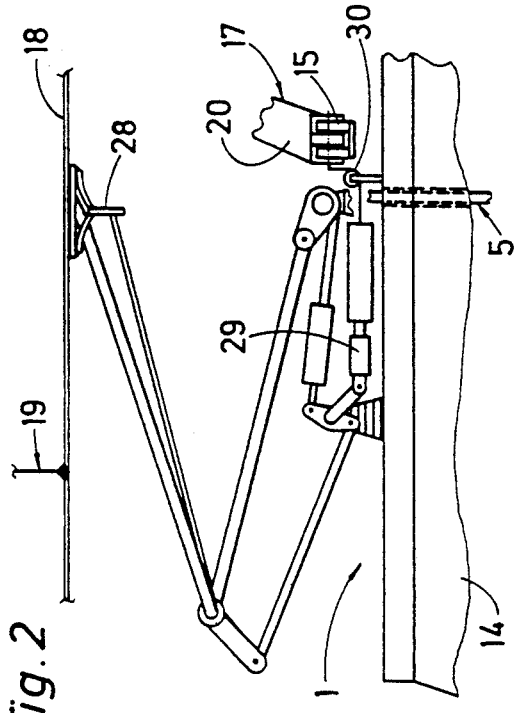
Fig. 2
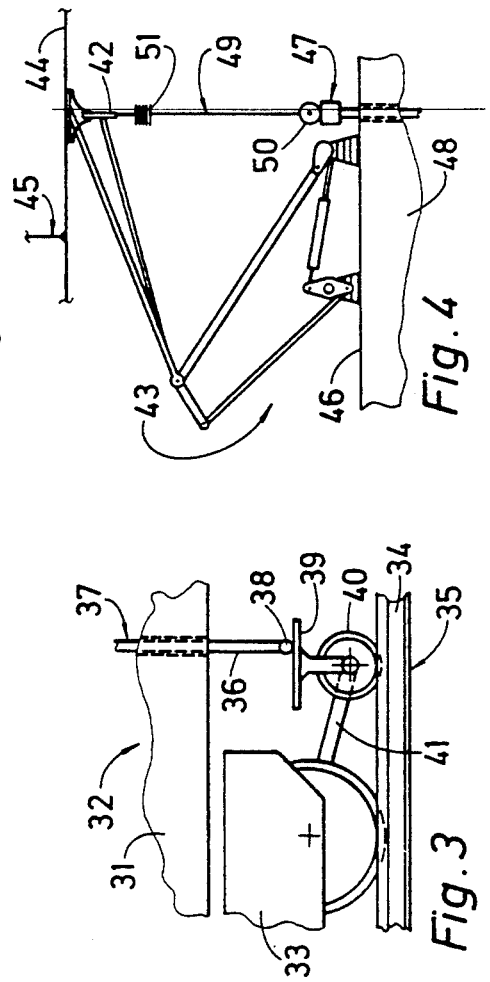
Fig. 4
Fig. 3
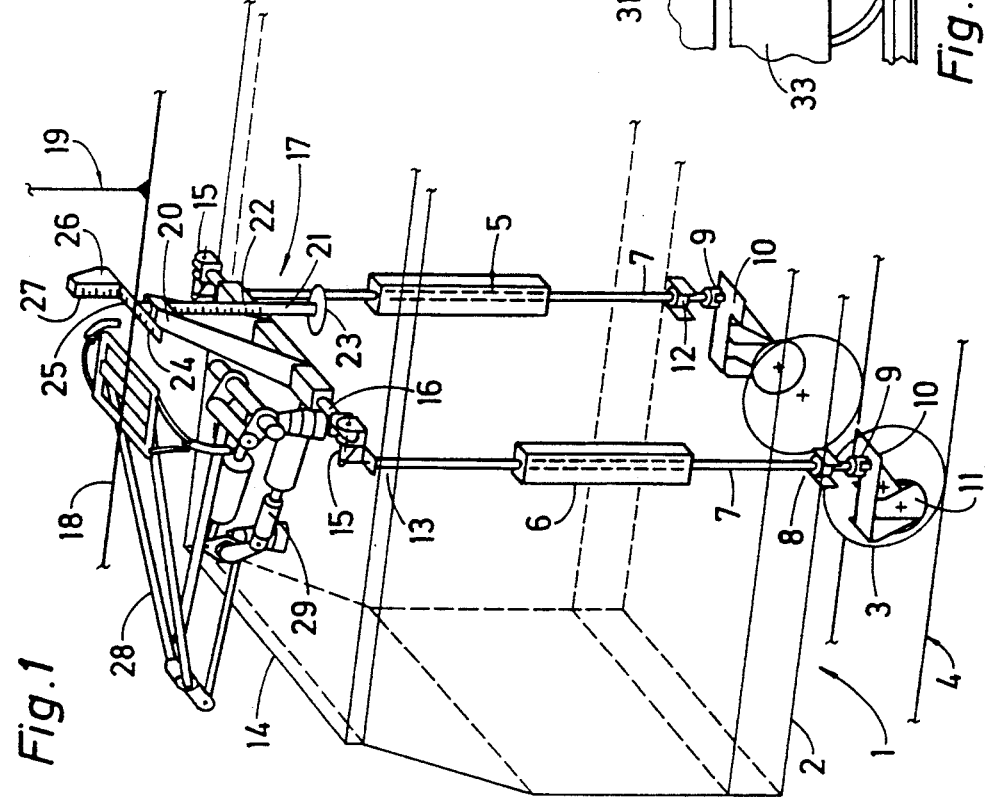
Fig. 1

MACHINE FOR MONITORING THE VERTICAL POSITION OF A CONTACT WIRE OF AN OVERHEAD LINE

BACKGROUND OF THE INVENTION

1. Field of the Invention

The present invention relates to a machine for monitoring the vertical position of a contact wire of an overhead line extending above a track comprising two rails having running faces defining a plane, which comprises a self-propelled machine frame including a superstructure, which may be a car box, an undercarriage supporting the machine frame on the track and having wheels journaled on a wheel axle and engaging the running faces of the track rails, and a vertically adjustable measuring yoke mounted on the machine frame.

2. Description of the Prior Art

The maintenance of electric railroad rights of way require not only track work but also the proper maintenance of the overhead line, and this has gained added importance as train speeds have increased, which requires accurate maintenance of the contact wire position. Self-propelled boom cars of the above-indicated type have been used for the maintenance and servicing of overhead lines. Their measuring yoke is a vertically adjustable pantograph mechanism mounted on the car box and, as the car advances along the track, the measuring yoke engages the contact wire and electronically monitors its position, and the monitored data are graphically recorded. While these machines have been successfully used, the vertical measurement results are sometimes falsified because the resilient mounting of the car box on the undercarriage tends to change its distance from the plane defined by the running faces of the track rails.

SUMMARY OF THE INVENTION

It is the primary object of this invention so to improve a machine of the indicated type that a dependable and accurate monitoring and control of the vertical position of the contact wire of an overhead line is assured under various operating conditions.

In a machine for monitoring the vertical position of a contact wire of an overhead line extending above a track comprising two rails having running faces defining a plane, which comprises a self-propelled machine frame including a superstructure, an undercarriage supporting the machine frame on the track and having wheels journaled on a wheel axle and engaging the running faces of the track rails, and a vertically adjustable measuring yoke mounted on the machine frame, the above and other objects are accomplished according to the invention with a frame vertically adjustably mounted on the machine frame for monitoring the vertical position of the contact wire, the monitoring frame having an upper end and a device connected to the upper monitoring frame end for measuring the vertical position of the contact wire, and a lower end at a fixed distance from the plane, which may engage the wheel axle or the plane defined by the track rail running faces.

This arrangement has the advantage that the vertical distance of the contact wire from the running plane of the machine is measured directly and accurately without falsification by the vibrating motions of the resiliently mounted machine frame since the monitoring frame is not fixedly but vertically adjustable mounted thereon.

According to one embodiment of the present invention, wherein the undercarriage comprises a bearing for the wheel axle, and the machine further comprises a horizontal support plate affixed to the bearing and extending parallel to the plane defined by the track rail running faces, the lower monitoring frame end engaging the support plate. This provides a measuring base serving as a dependable reference for measuring the vertical position of the contact wire by the monitoring frame since its distance from the running face of the track rail remains constant. If the lower monitoring frame end has rollers engaging the support plates on the axle bearings, they will assure a ready relative transverse displacement between the support plates on the undercarriage and the machine frame carrying the monitoring frame in track curves.

According to one preferred feature of this invention, the monitoring frame comprises two vertically adjustable vertical rods spaced from each other in a direction transverse to the track, each rod comprising two parts and a screw thread interconnecting the rod parts for vertical adjustment thereof. The vertical adjustment of the rod parts will change the length of the monitoring frame rods to compensate for any vertical distance change due to wear of the undercarriage wheels. The vertical rods may pass through the superstructure and have upper ends projecting thereabove, and the monitoring frame may further comprise a spacing member extending in a direction transverse to the track and respective joints linking the spacing member to the upper rod ends, the measuring device being connected to the spacing member. This will prevent a resilient movement of the machine frame on one side thereof from exerting a torque on the monitoring frame and bending it.

In accordance with another embodiment, the measuring device comprises a vertically extending threaded spindle carrying a vertical linear measuring scale, a bandwheel for turning the spindle, a horizontal sliding ledge connected to the threaded spindle and extending in a direction transverse to the track, the sliding edge carrying a linear measuring scale, and a holding element slidably mounted on the sliding edge, the holding element carrying a vertical linear measuring scale. This arrangement allows a simple and accurately readable measurement of the vertical contact wire position during the installation of the overhead line, the transverse displaceability of the holding element permitting adaptation to the zig-zag course of the contact wire.

The measuring device preferably further comprises an electronic displacement pickup arranged preferably insulated between the measuring yoke and the monitoring frame. This enables the vertical position of the contact wire to be electronically measured during the continuous advance of the machine along the track, and the electronically measured data may be transmitted to a terminal for processing by an operator. The pickup may be a rotary potentiometer.

The undercarriage wheels are preferably flanged wheels engaging the track rails and if a transmission is connected to the wheel axle between the flanged wheels, the monitoring frame is arranged between the flanged wheels and the lower monitoring frame end is connected to the transmission according to another preferred embodiment. This arrangement is simple and space-saving, the monitoring frame being concentrated in a small area so that it may be centered between the flanged wheels in the transverse direction immediately adjacent a protective wall of the machine frame superstructure. Since the monitoring frame is mounted on the transmission on the wheel axle, an accurate vertical measurement between the track rail running faces and the contact wire may be obtained. Any influence on the measurement results of unavoidable slight rotary movements of the transmission at the start of the machine advance and at the braking of the advance will be avoided if the lower monitoring frame end is connected to a shaft mounted on the transmission and extending in a direction transverse to the track, the lower monitoring frame end being connected to the shaft.

According to another preferred feature, the measuring device comprises a measuring beam extending in a direction transverse to the track and parallel to the wheel axle, and a vertical adjustment drive interconnects the lower and upper monitoring frame ends for vertically adjusting the upper monitoring frame end relative to the lower monitoring frame end. This enables a rapid displacement of the measuring beam from a rest position into an operating position in engagement with the contact wire. The measuring beam has a longitudinally extending upper edge, and the measuring device may further comprise a measuring ledge vertically spaced from, and extending parallel to, the upper measuring beam edge, a pivot extending parallel to the wheel axle in a direction transverse to the track, the pivot pivotally supporting the measuring ledge on the measuring beam for pivoting thereabout, the measuring ledge having a longitudinally extending upper edge for engagement with the contact wire, and a coil spring connected to the measuring ledge for biasing the upper measuring ledge edge away from the upper measuring beam edge. In this way, any errors in the vertical position of the contact wire engaged by the measuring ledge may be immediately detected by monitoring changes in the distance between the upper edges of the measuring beam and pivotal measuring ledge. Such vertical position errors may be accurately and continuously detected by a displacement pickup affixed to the adjustment drive and connected to the upper measuring ledge edge.

Preferably and if the adjustment drive is hydraulically operated and comprises a hydraulic valve controlling the operation of the drive, a limit switch is arranged between the measuring beam and the measuring ledge, and the limit switch is connected to the hydraulic valve and controls the operation thereof. This assures a steady pressure of the pivotal and spring-biased measuring ledge against the contact wire in dependence on any erroneous vertical position thereof so that this position may always be monitored at the regular contact pressure of the electric conductor engaging the contact wire during train operations.

If the adjustment drive is hydraulically operated and comprises a vertical cylinder having a longitudinal axis, at least one guide rod extending parallel to the drive cylinder and a guide block affixed to the drive cylinder are preferably provided, the guide rod or rods being vertically adjustably guided in the guide block. This will prevent the measuring beam from being turned so that it will remain in the correct transverse position in every vertical position.

The actual vertical position of the contact wire may be read at all times if a measuring ledge extending vertically to the wheel axle is connected to the measuring beam and carries a vertical linear measuring scale.

According to yet another preferred feature, the machine frame comprises two parallel guide ledges extending in a direction transverse to the track, the guide ledges defining an opening through which the lower monitoring frame end passes and the lower monitoring frame end being guided by the guide ledges without play, the opening have a greater width extending in the transverse direction than the corresponding width of the lower monitoring frame end. This enables the monitoring frame to move transversely relative to the machine frame in accordance with the track position and independently of vibrating machine frame.

In accordance with a further embodiment, flanged wheels are mounted on the lower monitoring frame end for engaging the running faces of the track rails. This enables the lower monitoring frame end to be disposed at a fixed distance from the running plane under various undercarriage structures.

BRIEF DESCRIPTION OF THE DRAWING

The above and other objects, advantages and features of the present invention will become more apparent from the following detailed description of certain now preferred embodiments thereof, taken in conjunction with the somewhat diagrammatic accompanying drawing wherein FIG. 1 is a fragmentary perspective view showing one embodiment of the machine of this invention;

FIG. 2 is a side elevational view of the measuring yoke of the machine of FIG. 1;

FIG. 3 is a fragmentary side elevation view showing another embodiment of a support for the lower monitoring frame end;

FIG. 4 is a fragmentary side elevational view showing another embodiment of the measuring yoke;

DETAILED DESCRIPTION OF PREFERRED EMBODIMENTS

Figure 5:
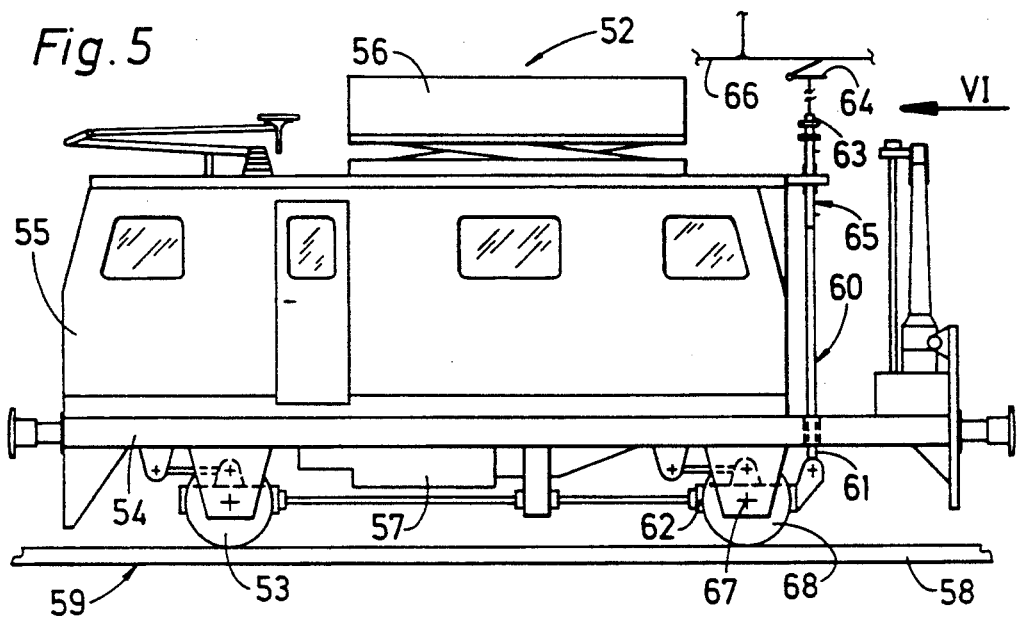
FIG. 5 is a side elevational view showing another embodiment of the machine of the invention.

Referring now to the drawing and first to FIGS. 1 and 2, there is shown schematically indicated machine 1 for monitoring the vertical position of contact wire 18 of overhead line 19 extending above track 4 comprising two rails having running faces defining a plane. The machine comprises self-propelled machine frame 2 including superstructure 14 constituted by a car box. Undercarriage 3 supports machine frame 2 on the track and has wheels journaled on a wheel axle and engaging the running faces of the track rails. Vertically adjustable measuring yoke 28 is mounted on machine frame 2, i.e. on its superstructure in the illustrated embodiment.

Frame 5 is vertically adjustably mounted on machine frame 2 for monitoring the vertical position of contact wire 18. The monitoring frame has upper end 13 and device 17 is connected to the upper monitoring frame end for measuring the vertical position of the contact wire, while lower end 8 is held at a fixed distance from the plane defined by the running faces of the track rails.

Undercarriage 3 of machine 1 comprises bearings 11 for the wheel axle, and horizontal support plates 10 are affixed to the bearings and extend parallel to the plane defined by the track rail running faces, lower monitoring frame end 8 engaging the support plates. As shown, rollers 9 at the lower monitoring frame end engage the support plates. Support plates 10 have a sufficient width to assure engagement of rollers 9 with the support plates even in sharp track curves when a relative transverse displacement of undercarriage 3 and machine frame 2 occurs. Monitoring frame 5 of the embodiment of FIG. 1 comprises two vertically adjustable vertical rods 7, 7 spaced from each other in a direction transverse to track 4, each rod comprising two parts and screw thread 12 interconnecting the rod parts for adjustment of the rod length. This adjustment compensates for a reduction in the wheel diameter due to wear, which leads to a corresponding lowering of support plate 10.

As shown, vertical rods 7 pass through superstructure 14 and have upper ends 13 projecting thereabove, and monitoring frame 5 further comprises spacing member 16 extending in a direction transverse to track 4 and respective joints 15 link spacing member 16 to upper rod ends 13. Measuring device 17 is connected to the spacing member. It comprises A-shaped support frame 20 for vertically extending threaded spindle 21 arranged substantially in a central plane of track 4 and carrying vertical linear measuring scale 22. The lower end of spindle 21 carries handwheel 23 for turning the spindle so that the measuring scale may be vertically adjusted relative to monitoring frame 5. Horizontal sliding ledge 24 is connected to an upper end of the threaded spindle and extends in a direction transverse to the track, the sliding edge carrying linear measuring scale 25. Holding element 26 is slidably mounted on sliding edge 24, the holding element carrying vertical linear measuring scale 27.

As shown in FIGS. 1 and 2, vertically adjustable measuring yoke 28 is mounted on the roof of car box 14 for engagement with contact wire 18. For measuring the vertical position of contact wire 18 while machine 1 advances along track 4, electronic displacement pickup 29 is arranged between measuring yoke 28 and monitoring frame 5. In this monitoring operation, measuring frame 5 provides an absolutely dependable and constant reference base for determining the vertical distance of the contact wire from the running plane of track 4 because it is mounted directly on undercarriage 3 and thus is not subject to any vibrating motions due to the resilient mounting of machine frame 2 on the undercarriage, the mounting of the monitoring frame being independent of the machine frame. However, since measuring yoke 28 is affixed to the machine frame and any vertical vibratory motion of the machine frame and superstructure is, therefore, detected by displacement pickup 29 and could falsify the measurements of the vertical position of contact wire 18, the pickup is connected to measuring frame 5 by a cable or rope trained over rotatable guide roller 30 affixed to the roof of car box 14 to compensate for any vertical movements of the car box relative to monitoring frame 4.

FIG. 3 schematically illustrates machine 32 for monitoring the vertical position of a contact wire of an overhead line extending above track 35 comprising two rails 34 having running faces defining a plane. The machine comprises self-propelled machine frame 31 and undercarriage 33 supporting machine frame 31 on the track and has wheels journaled on a wheel axle and engaging the running faces of the track rails. Vertical guide rod 36 of monitoring frame 37 is vertically adjustably guided in machine frame 31 and its lower end 38 is supported on horizontal support plate 39 in a manner similar to the one described in connection with FIG. 1. However, support plate 39 is affixed to flanged wheel 40 linked to undercarriage 33 by rod 41. Functionally equivalent to the arrangement of FIG. 1, the support plate provides a fixed reference base for the vertical position measurement of the contact wire.

In the embodiment of FIG. 4, vertically adjustable measuring yoke 42 on machine 43 is mounted on the roof of car box 46 for controlling contact wire 44 of overhead line 45. Monitoring frame 47 is vertically adjustably mounted on machine frame 48 of machine 43, and measuring device 49 connected to the upper end of the monitoring frame comprises a displacement pickup in the form of potentiometer 50 arranged between monitoring frame 47 and measuring yoke 42. Electrical insulation 51 is arranged between potentiometer 50 and the measuring yoke.

The machine of the present invention may be used in the installation of a new overhead line for operation of electric trains or in the maintenance, servicing and repair of the contact wire of an existing overhead line, on the one hand, and for monitoring the vertical position of an overhead line in use during the continuous advance of the machine along the track, on the other hand. In the first case, the measuring scales on measuring device frame 20 are used while the machine stands still, and the measures are used by the installing or maintenance personnel to mount or re-arrange contact wire 18 in the correct vertical position. In the second case, the measuring scales are not used and measuring yoke 28 is utilized for monitoring the vertical position of the contact wire while an operator on machine 1 may also visually monitor the zig-zag course of contact wire 18 by means of markings on the measuring yoke.

Various means (not illustrated) may be used for measuring the vertical position of the contact wire, such as optical eye arrangements and other opto-electronic means as well as inductive proximity fuses for detecting the position of the contact wire without physical contact therewith.

FIG. 5 illustrates another embodiment wherein machine 52 has undercarriages 53 with flanged wheels 68 engaging track rails 58 of track 59. The machine further comprises machine frame 54 carrying superstructure 55 on which vertically displaceable and rotatable work platform 56 is mounted. Machine 52 is propelled along the track by drive 57. Power is transmitted from drive 57 to flanged wheels 68 by transmission 62 connected to wheel axle 67 between the flanged wheels, and monitoring frame 60 is arranged centrally between the flanged wheels immediately adjacent an end wall of superstructure 55 outside this superstructure. Lower monitoring frame end 61 is connected to transmission 62 on wheel axle 67. Upper end 63 of monitoring frame 60 is connected to a measuring device for monitoring the vertical position of contact wire 66, and this measuring device comprises measuring beam 64 extending in a direction transverse to track 59 and parallel to wheel axle 67. Vertical adjustment drive 65 interconnects lower and upper monitoring frame ends 61, 63 for vertically adjusting upper monitoring frame end 63 relative to lower monitoring frame end 61. Rotatable shaft 69 is mounted on transmission gear box 62 and extends in a direction transverse to track 59, and lower monitoring frame end 61 is connected to the shaft so that the monitoring frame may rotate relative to the wheel shaft.

Figure 6:
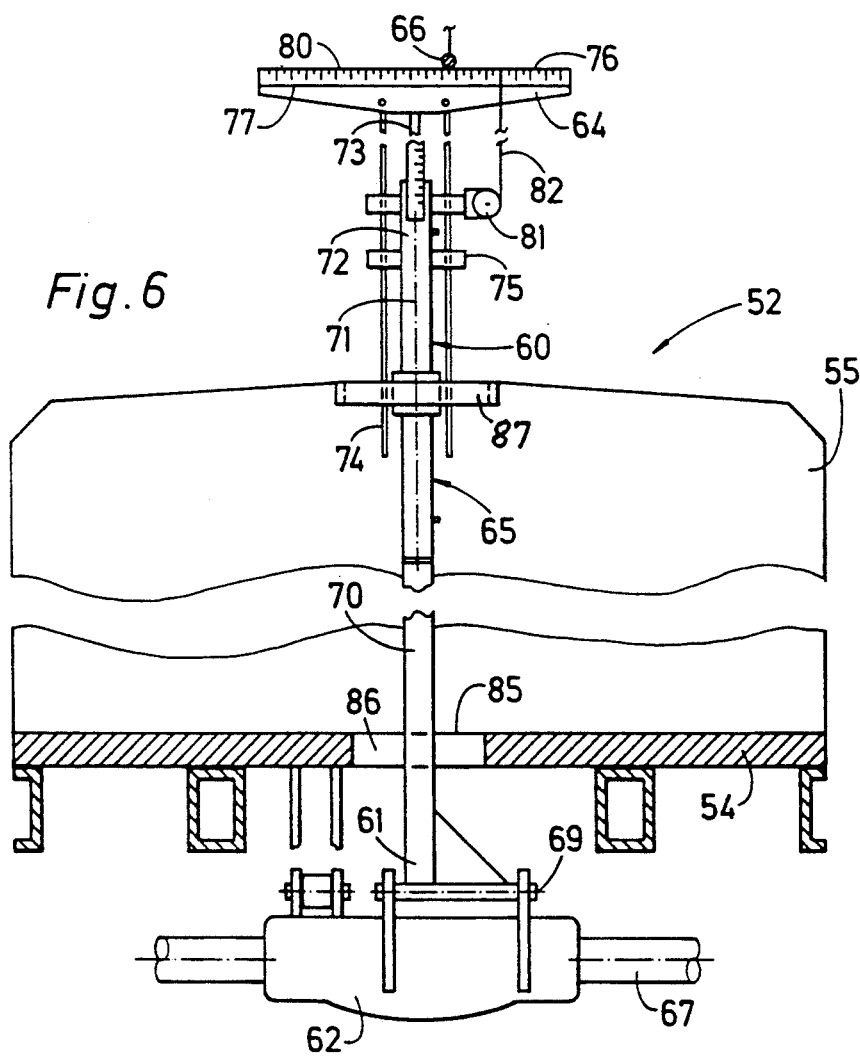
FIG. 6 is an enlarged end view, partly in section, of the monitoring frame of the machine of FIG. 5, seen in the direction of arrow VI therein.
Figure 7:
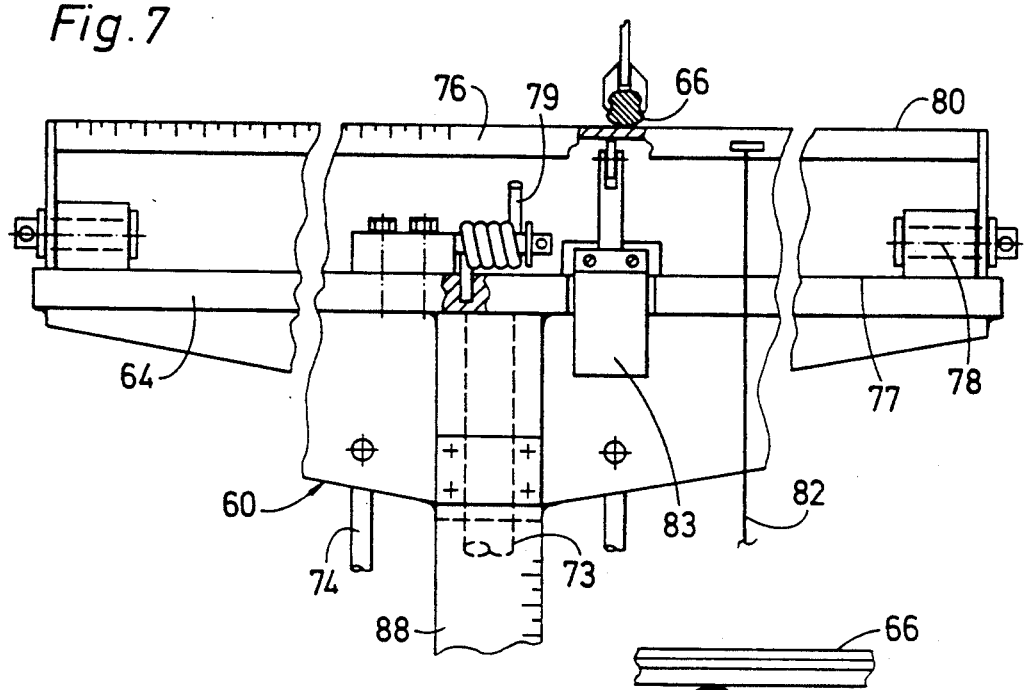
FIG. 7 is an enlarged end view of the measuring beam and ledge of this monitoring frame.

As shown in FIGS. 6 and 7, measuring frame 60 comprises vertical carrier rod 70. Adjustment drive 65 is hydraulically operated and comprises vertical cylinder 72 concentric with the carrier rod and having longitudinal axis 71 extending perpendicularly relative to wheel axle 67, and piston rod 73 connected to measuring beam 64. Guide rods 74 extend parallel to drive cylinder 72 and guide block 75 is affixed to the drive cylinder, the guide rods being vertically adjustably guided in the guide block.

Figure 8:
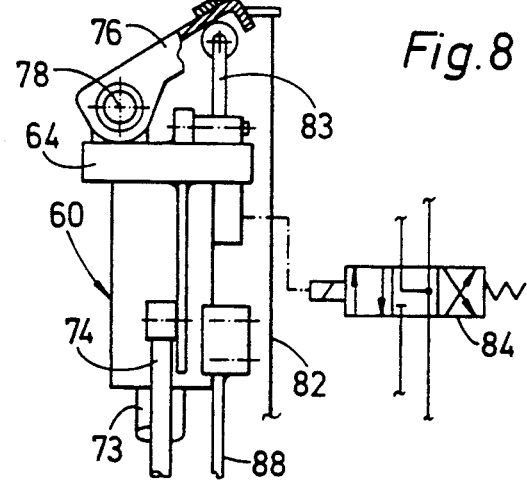
FIG. 8 is a side elevational view of the measuring beam and ledge of FIG. 7.

Measuring beam 64 has longitudinally extending upper edge 77, and the measuring device further comprises measuring ledge 76 vertically spaced from, and extending parallel to, upper measuring beam edge 77. Pivot 78 extending parallel to wheel axle 67 in a direction transverse to the track pivotally supports measuring ledge 76 on measuring beam 64 for pivoting thereabout, the measuring ledge having longitudinally extending upper edge 80 for engagement with contact wire 66. Coil spring 79 is anchored on measuring beams 64 and connected to measuring ledge 76 for biasing upper measuring ledge edge 80 away from upper measuring beam edge 77. Displacement pickup 81, illustrated as a rotary potentiometer, is affixed to adjustment drive 65 by a bracket on drive cylinder 72 and is connected to upper measuring ledge edge 80 by cable or rope 82 extending parallel to longitudinal axis 71 of the drive cylinder. As shown in FIGS. 7 and 8, limit switch 83 is arranged between measuring beam 64 and measuring ledge 76, and hydraulically operated adjustment drive 65 comprises hydraulic valve 84 controlling the operation of the drive. Limit switch 83 is connected to hydraulic valve 84 and controls the operation thereof. Furthermore, another measuring ledge 88 is connected to measuring beam 64 and extends vertically to wheel axle 67, measuring ledge 88 carrying a vertical linear measuring scale.

As shown in FIG. 6, machine frame 54 comprises two parallel guide ledges 86 extending in a direction transverse to track 59 and defining opening 85 through which lower monitoring frame end 61 passes and is guided by guide ledges 86 without play. Opening 85 has a greater width extending in the transverse direction than the corresponding width of the lower monitoring frame end. A similar guide for the monitoring frame is shown at 87 at the top of superstructure 55, such a guide bracket being illustrated in FIG. 5 affixed to the end wall of the superstructure.

To monitor the vertical position of contact wire 66, monitoring frame 60 is vertically adjusted by drive 65 until measuring ledge 76 engages the contact wire. Limit switch 83 and the bias of coil spring 79 are so coordinated that the limit switch will actuate hydraulic valve 84 for interrupting the operation of adjustment drive 65 when the coil spring exerts the desired contact pressure on the measuring ledge for engaging the contact wire, for example 1 kp. In this position of measuring ledge 76, the actual distance of contact wire 66 engaged by upper measuring ledge edge 80 from the running plane defined by the running faces of track rails 58 may be readily read from the measuring scale on vertical measuring ledge 88. Displacement pickup 81 at the same time converts the vertical measurement into electrical signals which may be converted into digital read-outs, if desired.

As machine 52 is advanced continuously along track 59, any deviation of the vertical position of contact wire 66 engaged under pressure by measuring ledge 76 will cause the measuring ledge to be pivoted about pivot axle 78, and limit switch 83 will actuate hydraulic valve 84 to operate adjustment drive 65 for vertical adjustment of monitoring frame 60 until the above-described coordination between the limit switch and the coil spring bias will cause the actuation of the adjustment drive to be halted again. In this way, the distance between measuring beam 64 and contact wire 66 remains essentially constant during the entire monitoring operation. The described change in the vertical position of the measuring beam relative to displacement pickup 81 and the track running plane when the measuring ledge detects a deviation in the vertical position of the contact wire is recorded by the pickup. This constant and automatic control of the vertical position of measuring beam 64 and the position of measuring ledge 76 relative thereto has the advantage that, regardless of any detected deviations of the vertical position of contact wire 66, the same contact pressure of the measuring ledge against the contact wire is assured. In this way, the monitoring of the vertical contact wire position by machine 52 is always effected under the same conditions prevailing when a trolley arm of an electric locomotive engages the contact wire.

Figure 9:
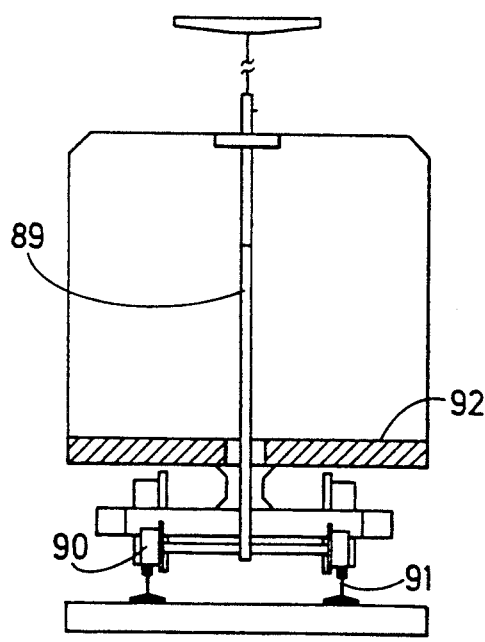
FIGS. 9 and 10 are schematic end views of further embodiments.

FIG. 9 schematically illustrated an embodiment of a machine including machine frame 92, which is quite similar to that described hereinabove in connection with FIGS. 5 to 8. In this embodiment, the lower end of monitoring frame 89 (which is quite similar to monitoring frame 60) is supported on flanged wheels 90 for engaging the running faces of track rails 91, i.e. directly on the track rather than on the wheel axle.

Figure 10:
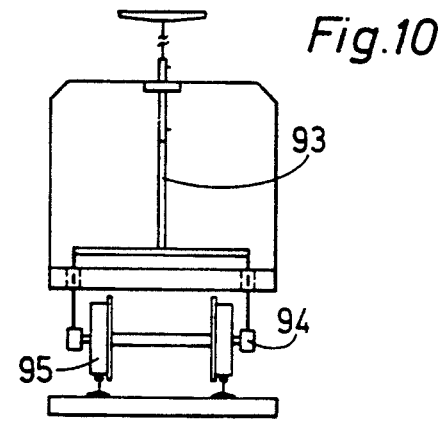

The similar illustration of FIG. 10 shows the lower ends of monitoring frame 93 supported on journal boxes 94 of undercarriage 95 of the machine.

What is claimed is:

1. A machine for monitoring the vertical position of a contact wire of an overhead line extending above a track comprising two rails having running faces defining a plane, which comprises
    (a) a self-propelled machine frame including a superstructure,
    (b) an undercarriage supporting the machine frame on the track and having wheels journaled on a wheel axle and engaging the running faces of the track rails, and
    (c) a frame vertically adjustably mounted on the machine frame for monitoring the vertical position of the contact wire, the monitoring frame having an upper end and a device connected to the upper monitoring frame end for measuring the vertical position of the contact wire, and a lower end below the machine frame fixed at a distance relative to the plane, such that vertical movement of said machine frame does not cause movement of the measuring device.

2. The machine of claim 1, wherein the lower monitoring frame end is mounted on the wheel axle.

3. The machine of claim 1, wherein the lower monitoring frame end is mounted on the running faces of the track rails.

4. The machine of claim 1, wherein the undercarriage comprises a bearing for the wheel axle, and further comprising a horizontal support plate affixed to the bearing and extending parallel to the plane defined by the track rail running faces, the lower monitoring frame end engaging the support plate.

5. The machine of claim 4, further comprising roller means at the lower monitoring frame end, the roller means engaging the support plate.

6. The machine of claim 1, wherein the monitoring frame comprises two vertically adjustable vertical rods spaced from each other in a direction transverse to the track, each rod comprising two parts and a screw thread interconnecting the rod parts for vertical adjustment thereof.

7. The machine of claim 6, wherein the vertical rods pass through the superstructure and have upper ends projecting thereabove, and the monitoring frame further comprises a spacing member extending in a direction transverse to the track and respective joints linking the spacing member to the upper rod ends, the measuring device being connected to the spacing member.

8. The machine of claim 7, wherein the measuring device comprises a vertically extending threaded spindle carrying a vertical linear measuring scale, a handwheel for turning the spindle, a horizontal sliding ledge connected to the threaded spindle and extending in a direction transverse to the track, the horizontal sliding ledge carrying a linear measuring scale, and a holding element slidably mounted on the sliding ledge, the holding element carrying a vertical linear measuring scale.

9. The machine of claim 1, further comprising a vertically adjustable measuring yoke mounted on the machine frame, and wherein the measuring device further comprises an electronic displacement pickup arranged between the measuring yoke and the monitoring frame.

10. The machine of claim 9, wherein the pickup is a rotary potentiometer.

11. The machine of claim of 1, wherein the undercarriage wheels are flanged wheels engaging the track rails, further comprising a transmission connected to the wheel axle between the flanged wheels, the monitoring frame being arranged between the flanged wheels and the lower monitoring frame end being connected to the transmission.

12. The machine of claim 11, further comprising a shaft mounted on the transmission and extending in a direction transverse to the track, the lower monitoring frame end being connected to the shaft.

13. The machine of claim 1, wherein the measuring device comprises a measuring beam extending in a direction transverse to the track and parallel to the wheel axle, and further comprising a vertical adjustment drive interconnecting the lower and upper monitoring frame ends for vertically adjusting the upper monitoring frame end relative to the lower monitoring frame end.

14. The machine of claim 13, wherein the measuring beam has a longitudinally extending upper edge, and the measuring device further comprises a measuring ledge vertically spaced from, and extending parallel to, the upper measuring beam edge, a pivot extending parallel to the wheel axle in a direction transverse to the track, the pivot pivotally supporting the measuring ledge on the measuring beam for pivoting thereabout, the measuring ledge having a longitudinally extending upper edge for engagement with the contact wire, and a coil spring connected to the measuring ledge for biasing the upper measuring ledge edge away from the upper measuring beam edge.

15. The machine of claim 14, further comprising a displacement pickup affixed to the adjustment drive and connected to the upper measuring ledge edge.

16. The machine of claim 14, further comprising a limit switch arranged between the measuring beam and the measuring ledge, the adjustment drive being hydraulically operated and comprising a hydraulic valve controlling the operation of the drive, and the limit switch being connected to the hydraulic valve and controlling the operation thereof.

17. The machine of claim 13, wherein the adjustment drive is hydraulically operated and comprises a vertical cylinder having a longitudinal axis, and further comprising at least one guide rod extending parallel to the drive cylinder and a guide block affixed to the drive cylinder, the at least one guide rod being vertically adjustably guided in the guide block.

18. The machine of claim 13, further comprising a measuring ledge connected to the measuring beam and extending vertically to the wheel axle, the measuring ledge carrying a vertical linear measuring scale.

19. The machine of claim 1, wherein the machine frame comprises two parallel guide ledges extending in a direction transverse to the track, the guide ledges defining an opening through which the lower monitoring frame end passes and the lower monitoring frame end being guided by the guide ledges without play, the opening have a greater width extending in the transverse direction than the corresponding width of the lower monitoring frame end.

20. The machine frame of claim 1, further comprising flanged wheels supporting the lower monitoring frame end and engaging the running faces of the track rails.

* * * * *